United States Patent [19]

Makabe et al.

[11] Patent Number: 4,596,201

[45] Date of Patent: Jun. 24, 1986

[54] METHOD OF CONTROLLING AN ELECTRONIC SEWING MACHINE

[75] Inventors: Hachiro Makabe, Kanagawa; Takeshi Kongoh, Tokyo; Haruhiko Tanaka, Mitaka, all of Japan

[73] Assignee: Janome Sewing Machine Co., Ltd., Tokyo, Japan

[21] Appl. No.: 608,021

[22] Filed: May 3, 1984

[30] Foreign Application Priority Data

May 11, 1983 [JP] Japan .................................. 58-80965

[51] Int. Cl.⁴ .............................................. D05B 3/02
[52] U.S. Cl. .................................. 112/453; 112/266.1
[58] Field of Search .......... 112/158 E, 121.11, 121.12, 112/453, 456, 457, 458, 266.1, 262.1

[56] References Cited

U.S. PATENT DOCUMENTS

| 4,141,305 | 2/1979 | Takenoya et al. | ............... 112/158 E |
| 4,221,177 | 9/1980 | Makabe et al. | .................. 112/158 E |
| 4,399,760 | 8/1983 | Bergvall | ........................... 112/158 E |

*Primary Examiner*—Peter Nerbun
*Attorney, Agent, or Firm*—Michael J. Striker

[57] ABSTRACT

In an electronic sewing machine, a pattern data memory has memory locations which are accessed in such a manner that address signals are prepared at random. These random address signals are used as stitch data to produce a specific version of a selected pattern.

5 Claims, 2 Drawing Figures

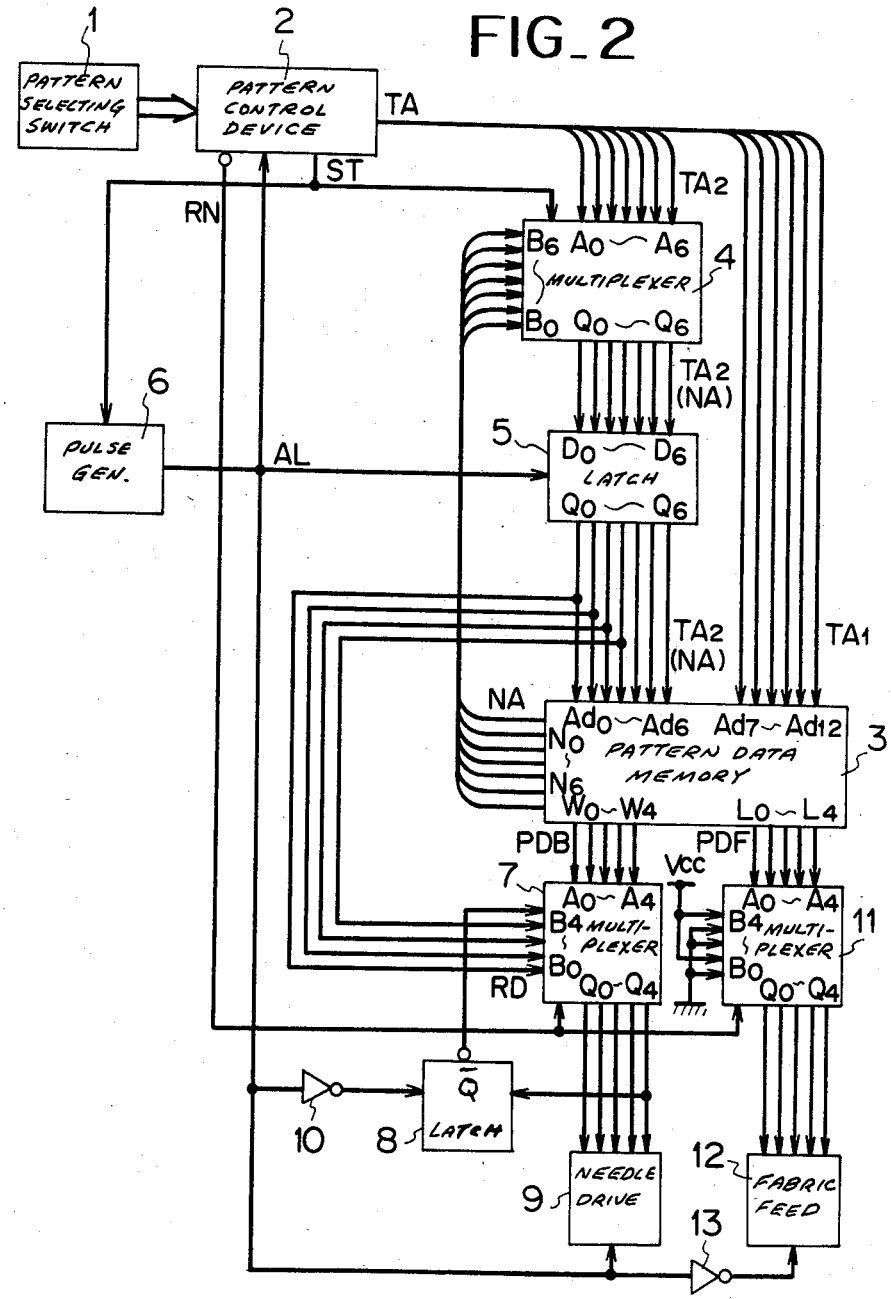

METHOD OF CONTROLLING AN ELECTRONIC SEWING MACHINE

BACKGROUND OF THE INVENTION

This invention relates to a method of and an electronic sewing machine for producing pattern patterns with stitches by varying relative position between a needle and a fabric to be sewn. The sewing machine is of the type which includes a rotary upper drive shaft coupled to the needle so as to reciprocate vertically the needle within a maximum swinging range while a fabric feeding device transports the fabric, thus forming zigzag stitches.

To embroidering stitches, such patterns as shading, vignette, graduation or the like are significant and interesting for making stitched patterns soft, smooth, cubic or solid (called this as mainly "shaded pattern" after). When shaded stitches are formed as in the embroidery stitch, such a pattern as shown in FIG. 1 is desired which is appropriately at random in needle amplitude position and is not clear in periodicity. However, for producing such desired patterns automatically, a huge capacity of memory has been required for storing needle amplitude data.

According to the invention, when pattern data are read out from a pattern data memory which stores a plurality of different ordinary patterns, each of the memory locations is accessed in such a manner that an address signal (code) is prepared at random with respect to a desired pattern. When the shaded stitches are to be formed the random address signal prepared for the desired pattern is used as the stitch data of the shaded pattern. Each of the stitch data of the shaded pattern employs a part of the data used just before the stitch as data which form the shaded stitch, whereby the stitch always moves over the center of the full amplitude of the needle, so that the stitches are made at random for forming the shaded pattern, and may be easily controlled.

BRIEF DESCRIPTION OF THE DRAWINGS

FIG. 1 is an example of forming stitch pattern in accordance with the invention, and FIG. 2 is a block diagram of a control circuit showing an embodiment of the invention.

DETAILED DESCRIPTION OF THE INVENTION

An embodiment of the invention will be explained with reference to the attached drawing. FIG. 2 is a block diagram of a control circuit of this invention installed in a sewing machine. A desired pattern is selected by operation of a pattern selecting switch 1, and a pattern number thereof is sent to a pattern number control device 2. The device 2 issues an initial address (TA) for reading out a stitch control signal for a 1st stitch of the desired pattern, and delivers a start signal (ST) determining start of the ordinary pattern at "H" level and delivers a shaded pattern signal (RN) at "L" level only in the case when a selected pattern is a shaded pattern.

A first group of address bits ($TA_1$) of the initial address (TA) are sent to terminals ($Ad_{12}$-$Ad_7$) of a pattern data memory 3, and a second group of address bits ($TA_2$) are applied to terminals ($A_6$-$A_0$) of a multi-plexor 4. When the start signal (ST) is at "H" level, the signals ($TA_2$) are output from terminals ($Q_6$-$Q_0$) of the multiplexer 4.

When the start signal (ST) is at "L" level, a subsequent or next address signal (NA) is output as the second group of address bits. The latch circuit 5 receives the second addresses ($TA_2$) or (NA) at the terminals ($D_6$-$D_0$), and latches the same in response to a latch signal (AL) at each of risings thereof and outputs from its output terminals ($Q_6$-$Q_0$) the latched second addresses to terminals ($Ad_6$-$Ad_0$) of the pattern data memory 3. The memory 3 stores at random storing locations binary stitch control data for a plurality of different patterns. Each of the stitch control data includes a next address code which can be sequentially read out in response to timing pulse signals.

An upper shaft phase signal generator 6 operates in synchronism with the upper drive shaft and receives the start signal (ST) when the pattern is selected, and generates pulse signals at rising of the start signal, and the pulse signal renders the address latch signal (AL). The upper shaft phase signal generator 6 renders the address latch signal (AL) at "H" level each time the needle moves upward above the fabric when ordinary stitching is renewed, and renders it at "L" level when the needle is under the fabric.

The pattern data memory 3 outputs, on reading in the first addresses ($TA_1$) and the second addresses ($TA_2$), needle amplitude data (PDB) of a 1st stitch from terminals ($W_4$-$W_0$), fabric feed data (PDF) from terminals ($L_4$-$L_0$), and data for next stitches from terminals ($N_6$-$N_0$), that is, next addresses (NA) for reading out data of a 2nd stitch. When the needle goes into the fabric and the address latch signal (AL) is at "L" level, the start signal (ST) is at "L" level, and the multi-plexer 4 outputs next addresses (NA) received at its terminals ($B_6$-$B_0$). When the address latch signal (AL) again rises, next addresses (NA) are latched at latch circuit 5. Only the second addresses ($TA_2$) are changed into next addresses (NA), and needle amplitude data (PDB) of a 2nd stitch and fabric feed data (PDF) are output.

In forming a particular pattern, next addresses (NA) of the pattern data memory 3 are read out in succession at random in response to advancing of the stitches, and in the present case, represented codes by second 4 bits are arranged in a table of random sampling numbers generated in response to each completion of about 80 stitches. When the shaded pattern is selected, the addresses of said 4 bits are used as a stitch control signal for the needle amplitude of the shaded pattern.

A multiplexer 7 for the needle amplitude data receives at input terminals ($A_4$-$A_0$) the needle amplitude data (PDB) of the pattern data memory 3. At its other input terminals ($B_4$-$B_0$), it receives at terminal ($B_4$) an output (Q) from a latch circuit 8, and at terminals ($B_3$-$B_0$) it receives signals from the terminals ($Q_3$-$Q_0$) of the latch circuit 5. When the shaded pattern signal (RN) is at "H" level, the multiplexer 7 outputs the signals (PDB) from the input terminals ($A_4$-$A_0$) to a needle amplitude drive device 9, and when the signal (RN) is at "L" level, it outputs shaded data (RD) from the other input terminals ($B_4$-$B_0$) to the device 9.

In the code of outputs from the multiplexer 7, 0 0 0 0 0 correspond to a right (R) of needle position FIG. 1, 0 1 1 1 1 correspond to a middle (M), and 1 1 1 1 0 correspond to a left (L). The latch circuit 8 inverts 1 and 0 values of each bit from the output ($Q_4$) of multi-plexor 7 and each time when the address latch signal (AL), supplied via an inverter 10 is falling, the latch 8 delivers the first bit to the other input (B₄) of the multiplexer 7. When the code of previous stitching data is the maximum number, the code of shading data (RD) of the stitches is less than 15 (code 0 X X X X) to the code 1 1 1 1 0 in response to (L) of FIG. 1 when the data are more than 1 0 0 0 0. When the previous stitching data are less than 0 X X X X, the shading data are more than 16 (code 1 X X X X). Each of the stitches always moves over the center of the full amplitude of the needle.

A needle amplitude drive device 9 moves a needle bar (not shown) when the address latch signal (AL) is at "H" level.

A multiplexer 11 for feeding the fabric receives at its terminals (A₄–A₀) fabric feed data (PDF) of the pattern data memory 3, and receives code 1 0 0 1 0 at its other terminals (B₄–B₀) by a combination of voltage (Vcc) of "H" level and earthing electric potential. When the shaded pattern signal (RN) is at "H" level, the signals of the input terminals (A₄–A₀) are output to the fabric feed drive device 12, and when it is at "L" level, the code 1 0 0 1 0 of its other input terminal (B₄–B₀) are output to said device 12 from the output terminals (Q₄–Q₀).

When the fabric feed drive device 12 receives "L" level of the address latch signal (AL) via an inverter 13, it drives a feed dog (not shown). In the drive device 12, the code 1 1 1 1 0 is the maximum of the forward feed, the code 0 0 0 0 0 is the maximum of the backward feed, and the code 0 1 1 1 1 is the zero of the feed. The shaded pattern designates the close stitch of the forward feed by the code 1 0 0 1 0.

When the shaded pattern is selected in the above mentioned structure, the shaded pattern signal (RN) from the pattern number control device 2 is at "L" level thereafter. The initial address (TA) gives its first addresses (TA₁) and second addresses (TA₂) to the pattern data memory 3.

The multiplexer 7 receives at its terminal (B₄) as shading data (RD), an initial one bit data from the latch circuit 8, and also receives at its terminals (B₃–B₀) the data of the second 4 bits of the second addresses (TA₂) from the terminals (Q₃–Q₀) of the latch circuit 5 terminals. Therefore, the amplitude drive device 9 moves the needle according to the shading data (RD). Since the first bit is 1, the needle is positioned lower than the center (M) of the needle amplitude in FIG. 1.

A multiplexer 11 outputs the code 1 0 0 1 0. When the sewing machine is driven and the address latch signal (AL) is at "L" level, the start signal (ST) is at "L" level, while the latch circuit 8 gives the data 0 to the terminal (B₄) of the multiplexer 7. The feed drive device 12 controls the non-illustrated feed dog by the code 1 0 0 1 0. Subsequently, when the address latch signal (AL) is at "H" level, the pattern data memory 3 receives next addresses (NA) as the second addresses. The multiplexer 7 outputs to the needle amplitude drive device 9 the shading data when data bit 0 of the terminal (B₄) and the data is at its second 4 bits of the next addresses (NA). The data is positioned upper than the center (M) the needle amplitude. Also in the following, each of the stitches advances over the center (M) of the needle amplitude. The second 4 bits of the next address (NA) are changed to the random values per each advance of the stitches, and therefore the shaded pattern moves at random alternately to the left (L) and to the right (R) from the center position (M) of the needle amplitude.

According to the present invention, it is possible to form the random shaded patterns desirable to make the embroidering stitches, and no space is needed for the shaded pattern in the pattern data memory.

We claim:

1. A method of controlling an electronic sewing machine including a driving means for reciprocating a needle within a predetermined amplitude range, means for feeding a fabric through a middle position of the needle amplitude range and an electronic memory for storing binary stitch control data for a plurality of different patterns, comprising the steps of storing said stitch control data at random memory locations;
   combining each stitch control data with a next address code;
   sequentially reading out the stored stitch control data pertaining to a selected pattern; and using the next address code as a new stitch control data applied to said needle driving means to produce a specific version of the selected pattern.

2. A method as defined in claim 1 further comprising the step of randomly dispersing said new stitch control data relative to said middle position of the needle amplitude range.

3. An electronic sewing machine including means for reciprocating a needle within a predetermined amplitude range, means for feeding a fabric through a middle point of the needle amplitude range and means for controlling position of the needle in the amplitude range, comprising
   (a) a pulse generator operating in synchronism with said reciprocating means to generate a sequence of timing pulses;
   (b) a memory for storing at random locations thereof stitch control data for a plurality of different patterns, said stitch control data being combined with a next address code;
   (c) means for sequentially reading out the stored stitch control data from said memory locations each time a timing pulse is generated by said pulse generator;
   (d) means for receiving from the read out stitch control data a part assigned to said needle position control means;
   (e) means for receiving from the read-out stitch control data a part assigned to said fabric feeding means; and
   (f) means for applying a designation signal to said first and second receiving means, said designation signal causing said first receiving means to receive said next address code and to output the same as a signal for controlling said needle position control means, and further causing said second receiving means to produce a new set of output data applied to said fabric feeding means.

4. An electronic sewing machine as defined in claim 3 wherein said needle position control means includes a needle position changing means for receiving a most significant bit of said next address code produced from said first receiving means, said needle position changing means being operated in response to said timing pulse to a control code value of the most significant bit of the following next address code in dependency on present value of said most significant bit.

5. The sewing machine as defined in claim 3, wherein said binary stitch control data are arranged at random locations of said memory in such a manner that the consecutive stitches alternately traverse said middle point of said needle amplitude range when said needle position changing means is operated.

* * * * *